US005798439A

United States Patent [19]

Lefebvre et al.

[11] Patent Number: 5,798,439

[45] Date of Patent: Aug. 25, 1998

[54] COMPOSITE INSULATING COATINGS FOR POWDERS, ESPECIALLY FOR MAGNETIC APPLICATIONS

[75] Inventors: Louis-Philippe Lefebvre, Longueuil; Sylvain Pelletier, Ste-Julie; Blaise Champagne, Boucherville, all of Canada

[73] Assignee: National Research Council of Canada, Ottawa, Canada

[21] Appl. No.: 686,610

[22] Filed: Jul. 26, 1996

[51] Int. Cl.[6] .......... C08F 6/00

[52] U.S. Cl. .......... 528/489; 528/502; 528/503; 427/212; 427/213.35; 427/213.36

[58] Field of Search .......... 528/489, 502, 528/503; 427/212, 213.35, 213.36

[56] References Cited

U.S. PATENT DOCUMENTS

| | | | |
|---|---|---|---|
| 4,601,765 | 7/1986 | Soileau et al. | 148/104 |
| 5,063,011 | 11/1991 | Rutz et al. | 264/126 |
| 5,211,896 | 5/1993 | Ward | 264/126 |
| 5,352,522 | 10/1994 | Kugimiya | 428/403 |

OTHER PUBLICATIONS

F. Kloucek et al; Journal de Physique, Coll. C6, Suppl. to No. 9, vol. 46, Sep. 1985.

*Primary Examiner*—Duc Truong
*Attorney, Agent, or Firm*—Juliusz Szereszewski

[57] ABSTRACT

A method for producing composite insulating coatings on powder particles, the coatings containing an electrically insulating metal compound and an organic polymer. The coatings are deposited preferably by controlled spraying, simultaneous or sequential, of sol precursors of insulating metal compounds and polymer emulsions or solutions onto polymer, metal or ceramic powder particles preferably during the blending or mixing of the particles. The process is useful for mass production of coated iron-based powders used for shaping components by powder metallurgy techniques for magnetic applications. Coated iron based powders can be cold or warm pressed and heat treated to obtain the desired mechanical properties.

8 Claims, 3 Drawing Sheets

COMPOSITE INSULATING COATINGS FOR POWDERS, ESPECIALLY FOR MAGNETIC APPLICATIONS

FIELD OF THE INVENTION

This invention relates to a process for preparing electrically insulated powders, e.g. iron-based powders for the manufacturing of components used in magnetic applications, and to the powders thus produced. More specifically, the invention is useful for producing magnetic iron powder cores for high frequency applications.

BACKGROUND OF THE INVENTION

Insulated laminated sheet steels have been used for decades to increase the resistivity of bulk steel. However, laminated steels have low resistivity (0.2–0.6 μΩ-m) and experience large core losses at high frequencies. The design of stacked magnetic components must take into account that the magnetic flux is confined in planes parallel to the sheet surfaces. Additionally, there are difficulties with miniaturization and waste material by punching can reach 60% to 80% for some types of electric motors. For numerous AC applications, materials with high induction, high permeability and low eddy-current losses are necessary.

Ferrites have high resistivity and are generally used at high frequencies. However, ferrites have low induction, are brittle and hardly machinable. Iron/dielectric composites (dielectromagnetics) manufactured by powder metallurgy can possess high induction, low losses and isotropic properties. Compared to laminated steels, dielectromagnetics made by powder metallurgy show considerably lower eddy-current losses and, in comparison with soft ferrites, they have higher magnetic saturation polarization and much better machinability.

Iron powder has been used for the production of magnetic cores for telephone transmission, with low losses and good magnetic stability. Powder metallurgy offers the possibility of controlling the spatial distribution of the magnetic flux inside a core. It also allows practically full utilization of materials even for complicated shapes. The choice of the powder type used will mainly depend on the application. Iron powders of high chemical purity have high compressibility, and are inexpensive and good quality materials for the fabrication of dielectromagnetics. Alloyed powders have good magnetic properties but have low compressibility and are expensive. Since eddy-current losses are expected to vary with the square of the particle diameter, fine particle size powders should be chosen at high frequency to decrease the core losses. However, when the average particle size is too low, it is difficult to obtain a satisfactory density with conventional compression molding techniques.

For DC applications, the best material will be the one with the highest magnetic saturation. At low AC frequencies, magnetic saturation, permeability and coercivity are important. At high AC frequencies, eddy currents become important and materials with high resistivity are necessary. Therefore, iron powders coated with insulating organic or inorganic films are desired for these magnetic applications.

The function of the insulating coating is to increase the resistivity of the composite in order to reduce the core losses and to maintain a constant magnetic permeability over an extended frequency range. The coating must be capable of being applied as a very thin layer that will withstand the mechanical stresses and the heat treatment at all stages of the core manufacturing.

The thickness and number of coatings can be adjusted within certain limits to obtain the desired properties. If permeability is the most important parameter, thin coating will be used in order to keep an effective packing of the magnetic particles. To minimize the hysteresis losses, a thermal resistant coating can be used (permitting a heat treatment of the parts). Thick or highly resistive coatings are effective to reduce the eddy-current losses at high frequencies. When the mechanical properties are not critical at low frequency, the less expensive solution is to use naturally oxidized powder in their green compact form. Such materials have been used for toroidal cores of chokes in fluorescent lamps, where moderate magnetic properties and energy losses are acceptable. If an element is going to be exposed to stresses greater than the mechanical strength of the internally bonded dielectromagnetic, it can be strengthened externally by coating the external surfaces with thin but tough materials (e.g. tapes or varnishes).

Ward et al., U.S. Pat. No. 5,211,896, presented a review of the techniques to electrically insulate particles with coatings. Such coatings can be inorganic (iron phosphate or alkali metal silicates) and/or organic, e.g. amber varnish/polystyrol, phenol-formaldehyde resin, varnishes formed from China-wood oil and/or phenol resin, resinous condensation products of urea or thiourea or derivatives thereof with formaldehyde, polymerized ethylene, styrene, butadiene, vinyl acetate, acrylic acid esters and derivatives thereof, copolymers of two or more of the foregoing as well as fluorine type polymers, or radical polymerizable monomers such as styrene, methyl methacrylate, methyl acrylate polymerized with the presence of an acidic sulfite ion.

Double coatings can be used to match different properties (magnetic, mechanical, chemical, thermal properties, etc.). It has been proposed to doubly coat the particles with polymers to bind the particles together and increase the mechanical strength of non-sintered bodies. Double coatings have been used to increase the resistivity and reduce the eddy-current losses. Roseby (U.S. Pat. No. 1,789,477) used iron powder coated with iron phosphate held together by synthetic resin varnish. The iron phosphate was produced by dipping the magnetic particles in a boiling zinc phosphate solution. The powder was then washed and dried.

Doubly coated particles that are first treated with phosphoric acid and coated with thermosetting phenolic material are disclosed in U.S. Pat. No. 2,783,208 to Katz. A method to doubly coat iron particles with iron phosphate and a thermoplastic material is disclosed in U.S. Pat. No. 5,063,011 to Rutz et al. According to the latter patent, diluted phosphoric acid is mixed with the iron powder in a vessel to form a hydrated iron phosphate at the surface of the powder. The powder is then dried and cured in an inert atmosphere to convert the hydrated layer to an iron phosphate layer. After the phosphating step, a thermoplastic coating is applied using a fluidized bed technique.

Doubly coated powders that are first coated with an alkali metal silicate and then overcoated with a silicone resin polymer are disclosed in U.S. Pat. No. 4,601,765 to Soileau et al. An aqueous alkali metal silicate is mixed with a wetting agent and the magnetic powder in a mortar mixer. The mixture is then dried by blowing hot air into the mixer. The powder is further dried in a forced draft oven at 120° C. for 1 hour to ensure complete drying. Heating to at least about 250° C. is required to drive out substantially the chemical bound water and cure the potassium silicate coating. A silicone resin is then applied to the silicate coated iron particles as a varnish in an organic solvent. The iron powder is then dried in an oven. It is then put back into the mixer with silicone resin diluted in toluene. The mixture is tumbled with a warm air flow through the mixer until dry.

A method to coat magnetic powder with thin oxide film by diffusion coating technique is disclosed in the U.S. Pat. No. 5,348,800 to Moro et al. The technique works well with alloyed powders (Fe-Si-Al alloys for example) to form metal oxides having low oxide forming free energy. The technique requires several steps and is not particularly suitable to produce low alloyed coated iron powders at relatively low cost.

The sol-gel process is a useful technique to make thin, uniform and highly electrically insulating coatings on fine particles. This coating process provides highly resistive encapsulated powders appropriate for the manufacture of magnetic cores with excellent magnetic characteristics. Kloucek et al., Journal de physique, Coll. C6, suppl. to No. 9, Vol. 46, p. C6-197 (1985) coated soft magnetic metal powders with glass using a sol-gel process and have consolidated the powder (without binder) at 600 MPa at temperatures ranging from 400° C. to 600° C. The sol-gel process has also been used by Kugimiya et al., U.S. Pat. No. 5,352,522, to coat oxidized alloyed powders with a thin $TiO_2$ film.

The sol-gel process used to coat powders generally involves dipping, filtration or/and evaporation of the solvent in a furnace or in vacuum. It is difficult to control the coating thickness when filtration is involved. The process generally requires a crushing of the particles after the filtration or the drying to desagglomerate the particles. The crushing can break the thin ceramic oxide film.

None of the aforementioned approaches provides powder coatings with an optimum combination of such properties as electrical insulation (resistivity), low magnetic losses, adequate density and mechanical strength of parts produced therefrom by conventional cold pressing techniques for magnetic applications or the production of magnetic parts.

It is therefore an object of the invention to provide electrically insulated powders having improved electrical properties, especially for the manufacturing of cold pressed or hot-pressed parts for magnetic applications.

It is a further object of the invention to provide a process for large-scale preparation of such insulated powders.

SUMMARY OF THE INVENTION

It has been found that a combination of the sol-gel technique with the use of polymeric coatings as binders gives unexpectedly good electrical properties of the resulting coated powders.

In one aspect of the invention, there is provided a process for preparing a mass of solid particles each comprising a solid core and an electro-insulating layer encapsulating said core, the process comprising

- providing a gellable sol which comprises at least one compound selected from the group consisting of a salt and an organometallic compound of a metal, preferably selected from the group consisting of Ti, Si, Al, Zr, Ni, Fe, Cr and Mg,
- providing a liquid solution or suspension of a polymer selected from a group consisting of electroinsulating thermoplastic and thermosetting polymers,
- coating simultaneously or sequentially said sol and said liquid solution or suspension onto the mass of the particles to encapsulate substantially each of the solid particles, and
- solidifying the coating in conditions sufficient to form an electrically insulating solid coating on substantially each of the particles.

The solidification of the coatings is effected by gelling the solution at the surface of the particle, removing the solvent and optional heat treatment of the coating. The heat treatment may be carried out either at a temperature below the level of total oxidation of said metal in said coating, e.g. below 400° C., or at a temperature sufficient to substantially oxidize the metal to a ceramic. The process must allow for the maximum working temperature acceptable for the polymer.

The polymer is selected from the group consisting of thermosetting resins, e.g. phenolic or epoxy resins, and thermoplastic resins. The only limitation on the choice of the polymer, which must of course be electroinsulative, is its ability to form solutions or emulsions in proper solvents or dispersants. The prior art listed above contains numerous examples of suitable polymers and all of them are also suitable for the purpose of the present invention.

Preferably, the process may be accomplished by spraying the coatings on the solid particles while mixing or blending the particles.

In another aspect of the invention, there is provided a mass of solid particles (powders) obtained by the process of the invention. The solid particles each comprise a solid discrete core and an insulating coating. The coating comprises an electrically insulating compound of a metal or metals preferably selected from the group consisting of Ti, Si, Al, Zr, Ni, Fe, Cr and Mg, and an electrically insulating organic polymer.

The coating may be a monolayer as a result of simultaneous application of a mixture of the sol and the polymer suspension or solution. Alternatively, as a result of sequential application of the above components, the coating may comprise at least one layer of the metal compound and at least one layer of the insulating organic polymer.

The coating may also comprise a plurality of layers, each comprising a different ratio of said electrically insulating metal compound to said organic polymer.

Such layers may be combined with layers consisting of one component (sol or polymer) only.

As a result of controlled heat treatment at temperatures below the oxidation level, the metal compound may only be partly oxidized. The resulting compound which must still exhibit sufficient electro-insulating properties, may be advantageous as having better susceptibility to mechanical treatment (pressing) than the more brittle oxide.

BRIEF DESCRIPTION OF THE DRAWINGS

The invention will be described in more detail in conjunction with the accompanying drawings in which.

Figure 4:
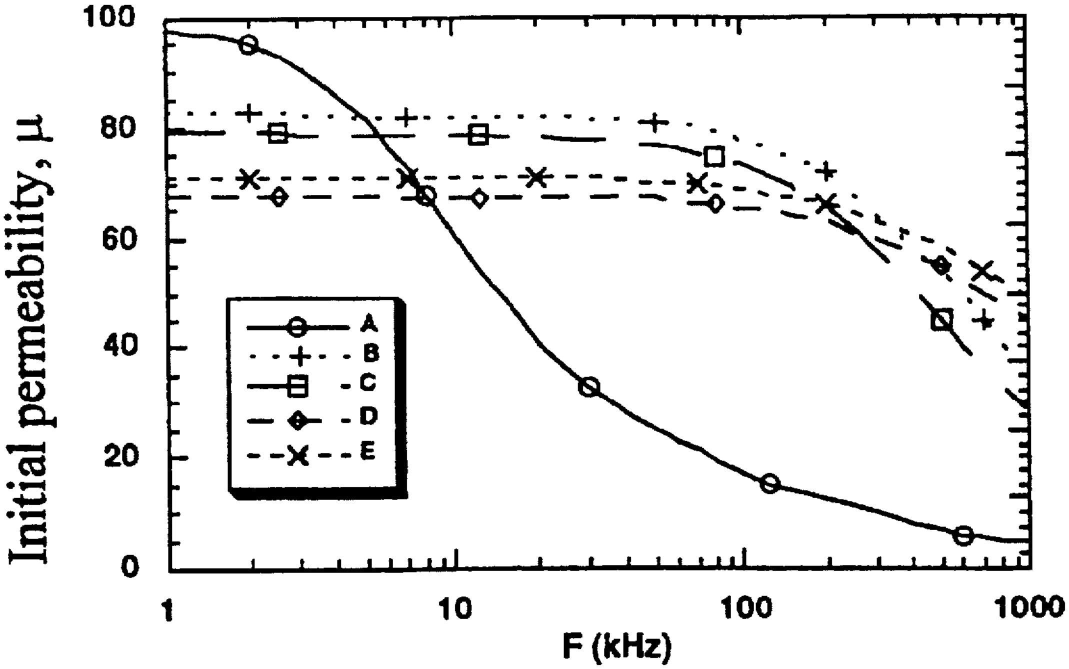
Figure 5:
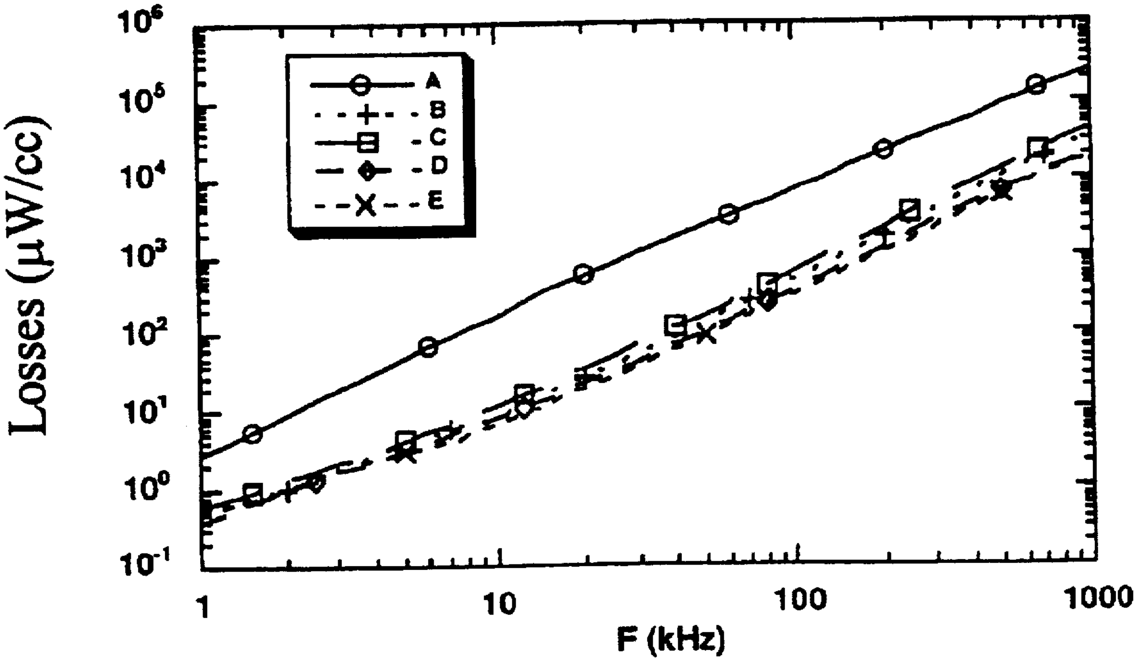

FIG. **3*a*** illustrates schematically a monolayer coating of the invention;

FIG. **3*b*** illustrates schematically a multilayer coating;

FIG. **3*c*** illustrates another multilayer coating of the invention;

FIG. 4 is a graph illustrating initial magnetic permeability of cold pressed samples at 45 tsi; and FIG. 5 illustrates the core losses of cold pressed samples at 45 tsi.

DETAILED DESCRIPTION OF THE INVENTION

The method of the present invention involves blending and spraying sols, emulsions, solutions or a mixture thereof onto the surface of powders in a manner to encapsulate the entire surface of a powder particle.

The sols are preferably salts and/or organometallic compounds which are precursors of oxides of metals, preferably from the following group: Ti, Si, Al, Zr, Ni, Fe, Cr, and Mg. The sol itself can contain one or more oxides (e.g. borosilicates or ferrites). Titanium alkoxide based sols are of interest for the purposes of the invention because of the low-cost of the starting material, commercially employed in industry for a few decades.

As mentioned hereinabove, the polymers may be thermosetting (e.g. phenolic or epoxy resins) or thermoplastic. The choice of polymers encompasses those mentioned in the Ward U.S. Pat. No. 5,211,896 the specification of which is incorporated herewith by reference. The polymers are dispersed in the form of solutions or emulsions for spraying onto the surface of powders to produce thin and uniform coatings.

The powders do not have to be treated chemically or electrochemically prior to the coating. They may or may not be oxidized.

In the tests to validate the invention, the powder was ATOMET™ 1001HP water atomized iron powder for soft magnetic P/M applications available from Quebec Metal Powders Limited, Tracy, Quebec. For the purpose of the invention, powders can be used having an average particle size ranging from 5 μm to 1 mm but preferably an average size ranging from 50 μm to 600 μm and more preferably less than 250 μm. The above-mentioned ATOMET powder has a particle size below 250 μm.

While a number of techniques for applying the coatings of the invention may be conceived, spraying (sequential or simultaneous) of solutions or emulsions produces relatively consistently uniform and thin coatings on the particles. The thickness of the coating can be controlled easily. The coating thickness depends on the quantity of sol used, the oxide content of the sol, the amount of polymer in the solution or emulsion and the number of coating cycles. The coating has a thickness of about 5–1000 nm, typically about 10–200 nm, preferably 20–100 nm.

In the tests to validate the invention, a sol, solution or emulsion was sprayed by means of an atomizer directly onto the powder in a rotating mixer. The solvent was then evaporated and recuperated under vacuum.

The preparation of the sol is typically carried out at room temperature. The sol can be prepared by diluting the precursors (e.g. salts or organometallics) in alcohol and/or water. The pH can be adjusted to control the hydrolysis rate. Catalysts or modifiers can also be used to adjust the hydrolysis rate.

Figure 1:
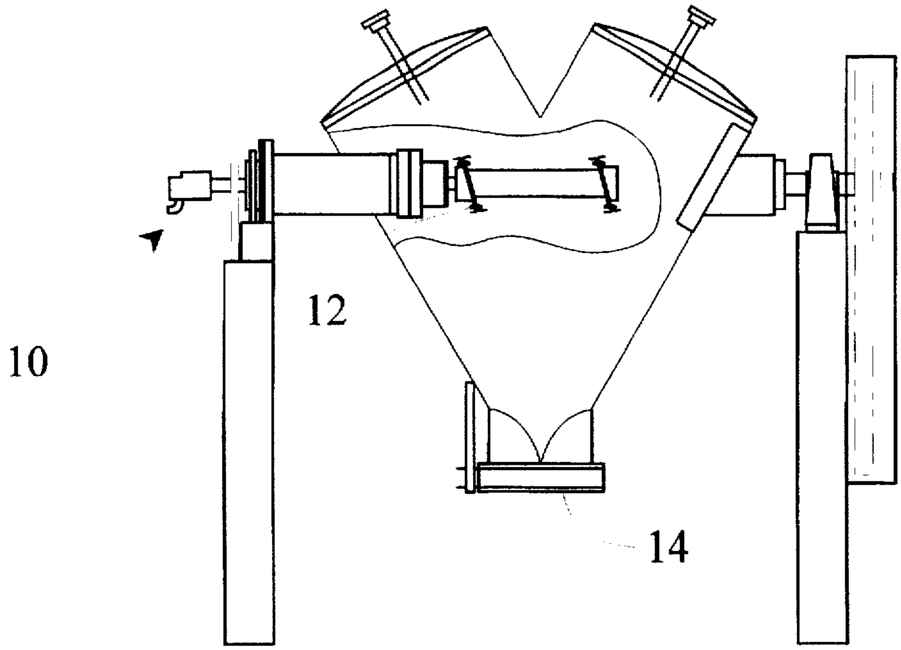
FIG. 1 is a schematic view, in partial cross-section, of an apparatus for applying the coatings of the invention.
Figure 2:
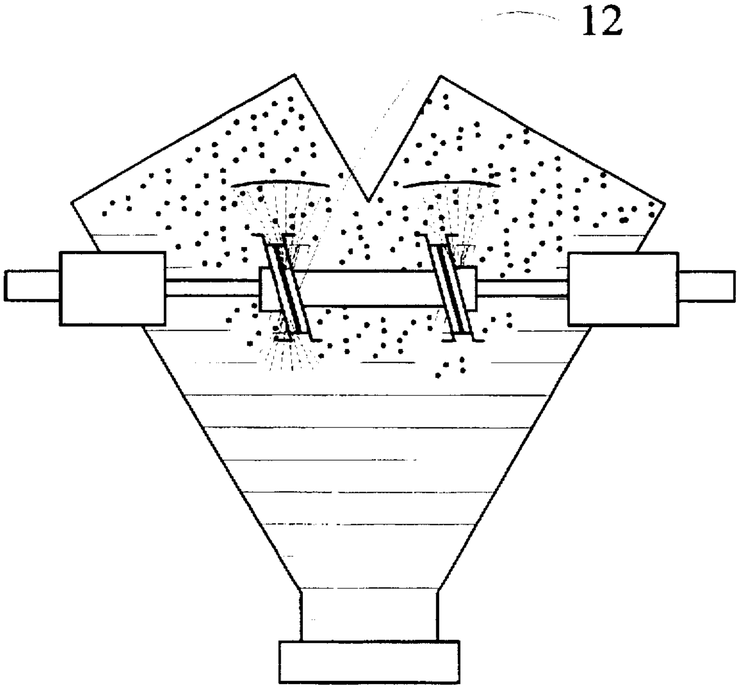
FIG. 2 is a schematic illustration of operation of the apparatus of FIG. 1.

Referring to the drawings, the tests were conducted using a "V" type blender (FIG. 1) filled with the powder. The temperature of the powder was 40° C. The sol was delivered through a conduit 10 and sprayed with an atomizer 12 while the blender was rotating. The spray pattern is shown in FIG. 2. Canted atomizing discs were employed for a wide spray. After the blend had mixed for a while (0 min to 120 min), air (containing moisture) was injected into the blender to allow a complete gelation of the sol at the surface of the particles. Alcohol was then evaporated, optionally with heating (25° C.–100° C.) and recuperated under vacuum. The blender rotated during the solvent removal step. The dried powder was removed at the bottom 14 of the blender and passed to a heat treatment unit, not shown in the drawings.

Figure 3A:
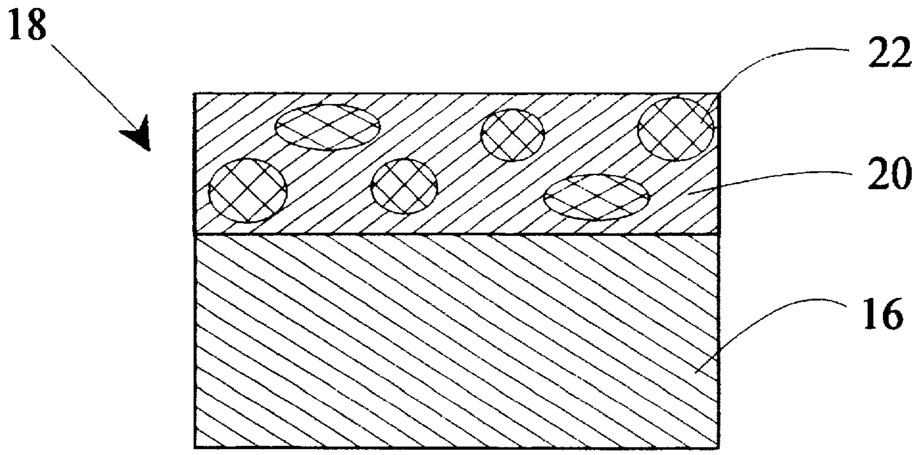
Figure 3B:
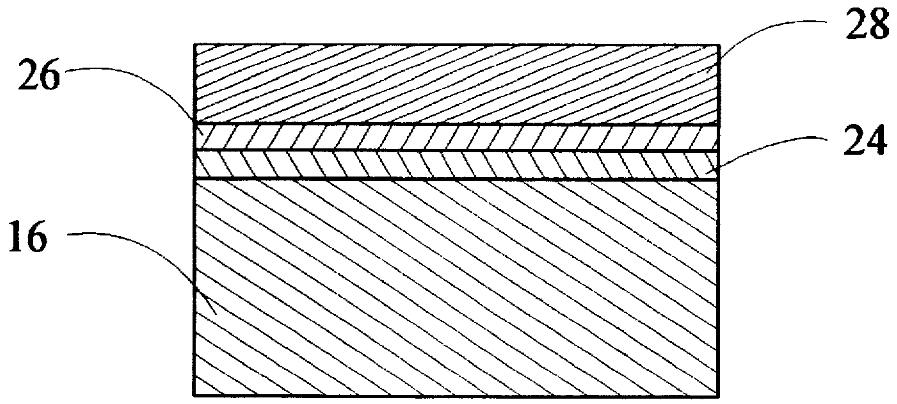
Figure 3C:
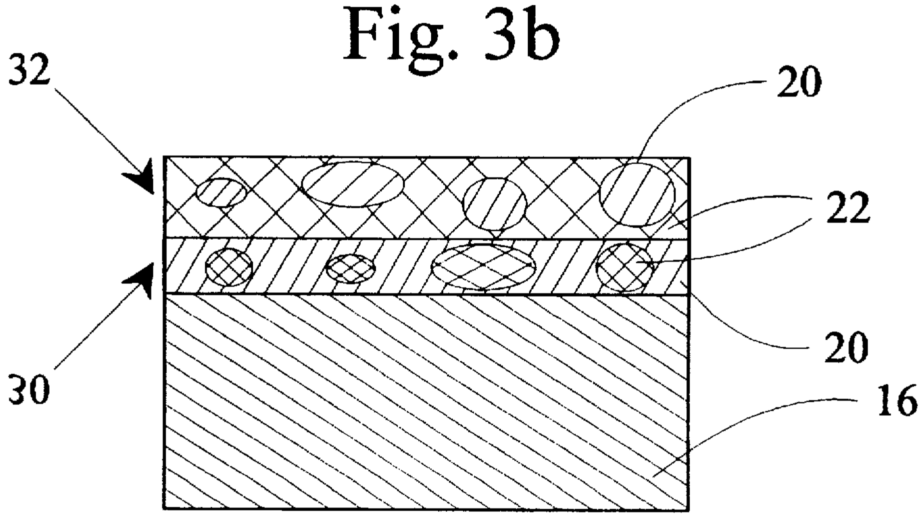

FIGS. 3*a*–3*c* illustrate the various types of coatings obtainable according to the invention. As seen in FIG. 3*a*, the surface of a substrate, an iron powder particle 16 is covered with a composite monolayer coating 18 composed of a gel 20 and a polymer 22.

The coating of FIG. 3*b* represents the same substrate 16 coated with two layers 24, 26 of a gel and a single layer 28 of a polymer.

FIG. 3*c* illustrates the concept of graded coatings of the invention. The substrate 16 is coated with a composite layer 30 containing a gel 20 and a polymer 22 at a certain ratio, and then with another composite layer 32 containing a similar or a different gel 20 and a polymer 32 at a different ratio than in the first layer 30. This gives rise to graded properties across the thickness of the layer.

As mentioned hereinabove, organic coatings can be deposited simultaneously with the sol on the surface of the powder particles. To do so, a polymer can be dissolved in an appropriate solvent or mixed with the sol to make an emulsion for injection in the blender.

The process is simple and inexpensive and allows the treatment of large quantities of powders (depending of the capacity of the "V" blender used). Any commercial "V" type or double-cone blender/dryer can be used for this purpose.

The coated powder can be heat treated at a temperature between 75° C. and 600° C. to develop the desired coating microstructure. Coatings with graded properties can be produced, as illustrated in FIG. 3*c*, by means of sequential or simultaneous spraying of solutions or emulsions to obtain the desired combination of physical and mechanical properties. Polymer compounds can constitute 0.001–15.0 wt % of the composite. Such polymer may be a thermoset (phenolic resin, epoxy, etc.) or a thermoplastic (polyethersulfone, polyetherimide, etc.). Such polymers can be used singly or in combination with other polymers. A coupling agent can also be admixed to increase the binding between the magnetic powder and the polymer or the sol-gel coating and increase the resistivity. An organic coating can also be dry mixed rather than sprayed.

EXAMPLE 1

This comparative example shows the effectiveness of the sol-gel coating to produce highly resistive materials with low magnetic losses.

The first samples were prepared with as-delivered QMP ATOMET™ iron powder (sample A).

The second samples were prepared with sol-gel coated QMP ATOMET™ 1001HP iron powder (sample B). These powders were prepared using a prehydrated isopropylic solution of titanium alkoxide stabilized with diethanolamine. The sol preparation involves the combination of a solution of 0.3 mole/l of titanium isopropoxide (Aldrich Chemical Company) in 1.6 mole/l of isopropanol with a solution of 0.3 mole/l of diethanolamine (Aldrich Chemical Company) in 0.8 mole/l of isopropanol and a solution of 0.3 mole/l of water in 0.8 mole/l of isopropanol. The iron powder was dipped in the sol, filtrated and dried 1 h at 75° C. in air.

The third samples were made by dry-blending ATOMET™ 1001HP iron powder for 90 min in a "V" type blender with 0.8 wt % phenolic resin (sample C).

The samples were single pressed at 45 tsi using a die wall lubricant (zinc stearate) into transverse rupture strength bars (1.25"×0.5"×0.25") to determine the physical and mechanical properties. Resistivity measurements were carried out using a four probe resistance measuring system. Rings (O.D.=2.071", I.D.=1.710", t=0.210") were also pressed with the same conditions to evaluate the magnetic properties such as the initial permeability and the core losses. The samples were cured in air at 160° C. for 360 min. The AC magnetic properties were evaluated on rings in the 1 kHz-1 MHz frequency range. The core losses were evaluated for an induction of 1 mT.

Table 1 compares the properties of cold pressed samples with as-delivered ATOMET™ iron powder (A), coated powder with 0.25 wt % sol-gel only (B) and dry blended powder with 0.8 wt % phenolic resin only (C).

TABLE 1

Properties of samples pressed at 45 tsi with as-delivered, sol-gel coated and 0.8 wt % phenolic resin dry blended ATOMET™ iron powder

| Samples | Coating | Density (g/cc) | Resis-tivity (μ½-m) | TRS (psi) | $\mu_i$ | Losses (100 kHz, 1 mT) (μW/cc) |
|---|---|---|---|---|---|---|
| A | None | 7.18 | 22 | 5020 | 98 | 7200 |
| B | 0.25% sol-gel | 7.15 | 279 | 4765 | 83 | 498 |
| C | 0,8% phenolic resin | 7.05 | 257 | 18052 | 79 | 637 |

The resistivity of the sol-gel coated powder was 12 times higher than that of the uncoated powder. The density of the sol-gel coated powder compact was similar to the density of the uncoated powder compact. Its density was higher than the density of resin coated powder (for a similar resistivity). As expected, the mechanical strengths of the uncoated and sol-gel coated powders were lower than the strength of the iron-resin powder.

As illustrated in FIG. 4 and shown in Table 1, the initial permeability was 83 and 79 for the sol-gel and resin coated powder respectively. The sol-gel coating reduces the loss considerably (FIG. 5) compared to the uncoated powder. At 100 kHz and 1 mT, the loss was 498 for the sol-gel coated powder and 7200 for the uncoated powder. The sol-gel coating is thus effective to produce compressible highly resistive coated powder with low core losses.

The sol-gel coated powder can be used with an external coating (tapes or varnishes) or in its green compact form in applications where mechanical properties are not critical and where both high resistivity and high density are desirable. The additional cost of the surface treatment is low and allows an inexpensive production of soft magnetic powders.

EXAMPLE 2

The properties of samples fabricated with composite coating were compared with the properties of iron-resin composite. The preparation and the properties of samples C are the same as those presented in Example 1. Samples D were prepared with ATOMET™ 1001HP iron powder sequentially coated with 0.25 wt % sol-gel and 0.8 wt % resin. The iron powder was coated by sol-gel using the method described in Example 1 and was afterwards dry blended with 0.8 wt % resin for 90 min. in a "V" type blender. Samples E were made using ATOMET™ 1001HP iron powder simultaneously coated with 0.12 wt % sol-gel and 0.8 wt % resin. The composite coating was applied using an emulsion sol/resin. The emulsion was prepared by mixing the resin with the sol. The powder was blended with the emulsion and the slurry was dried in an oven at 75° C. Strength test bars and rings were pressed using the technique described in Example 1. The properties of the coated powders are compared in Table 2.

TABLE 2

Properties of samples pressed at 45 tsi with ATOMET™ iron powder dry blended with 0,8 wt % phenolic resin, coated sequentially with 0.25 wt % sol-gel and 0.8 wt % resin and powders coated simultaneously with 0.12 wt % sol-gel and 0.8 wt % resin.

| Samples | Coating | Density (g/cc) | Resis-tivity (μ½-m) | TRS (psi) | $\mu_i$ | Losses (100 kHz, 1 mT) (μW/cc) |
|---|---|---|---|---|---|---|
| C | 0,8% phenolic resin | 7,05 | 257 | 18052 | 79 | 637 |
| D | 0.25% sol-gel + 0,8% resin (seq) | 6,99 | 1227 | 11798 | 68 | 365 |
| E | 0.12% sol-gel + 0,8% resin (sim) | 7,06 | 2126 | 7023 | 71 | 327 |

For a density slightly lower, the resistivity of the sequentially sol-gel/resin coated powder was 5 times higher than the resin-only coated powder. The resistivity of the pieces made using the powder coated simultaneously was 8 times higher than the resistivity of the pieces prepared using the powder coated with resin-only (for a similar density). The mechanical strength of the sol-gel coated powder was lower than the resin-only coated powder.

As illustrated in FIG. 4 and shown in Table 2, the initial permeability of the sequentially sol-gel/resin coated powder was 68 and 71 for the simultaneously coated one. At 100 kHz for an induction of 1 mT, the loss (FIG. 5) of the simultaneously coated sol-gel/resin powder was 327 compared to 637 for the resin-only coated powder. The powder coated with the composite sol-gel/resin coating was compressible, highly resistive and had acceptable mechanical strength for a wide range of applications.

The invention provides a means to produce a thin, electrically insulating coating on the surface of powders. The powders can be afterwards cold pressed into parts for magnetic applications necessitating high resistivity and appropriate mechanical properties. The coated powders are dry, free-flowing and non-agglomerated. The coatings can provide a good insulation between particles and the resulting powder can be shaped by conventional cold pressing techniques in the form of magnetic cores having high and constant magnetic permeability and low magnetic losses over a wide range of frequencies.

The invention provides magnetic powders with excellent AC characteristics which are suitable for conventional compression molding.

We claim:

1. A process for preparing a mass of solid particles each comprising a solid core and an electro-insulating layer encapsulating said core, the process comprising providing a gellable sol which comprises at least one compound selected from the group consisting of a metal salt and an organometallic compound, providing a liquid solution or suspension of a polymer selected from a group consisting of thermoplastic and thermosetting polymers, coating simultaneously or sequentially said sol and said liquid solution or suspension onto said mass of said particles to encapsulate substantially each of said solid particles, and solidifying said coating in conditions sufficient to form an electrically insulating solid coating on substantially each of said particles.

2. The process of claim 1 wherein the metal of said salt or of said organometallic compound is one or more metals selected from the group consisting of Ti, Si, Al, Zr, Ni, Fe, Cr and Mg.

3. The process of claim 1 wherein said solidifying of said coating is effected by gelling said sol on said particles and by removing a solvent therefrom.

4. The process of claim 3 wherein said gelling and solvent removal is followed by the step of a heat treatment of said coating at a temperature below the level of complete oxidation of said metal in said coating.

5. The process according to claim 1 wherein said polymer is selected from the group consisting of thermosetting resins and thermoplastic resins.

6. The process of claim 4 wherein said heat treatment is effected at a temperature below 400° C.

7. The process according to claim 1 wherein said coating of said solid particles is effected by spraying while mixing said particles.

8. The process according to claim 1 wherein said gelling and solidifying is effected in conditions sufficient to cause conversion of said metal compound to a metal oxide.

* * * * *